US009146166B2

(12) United States Patent
Köpken et al.

(10) Patent No.: US 9,146,166 B2
(45) Date of Patent: Sep. 29, 2015

(54) METHOD AND APPARATUS FOR DETERMINING AN ELECTRICAL TORQUE OF AN ELECTRICAL MACHINE

(71) Applicant: Siemens Aktiengesellschaft, München (DE)

(72) Inventors: Hans-Georg Köpken, Erlangen (DE); Stefan Künzel, Erlangen (DE); Hubert Schierling, Erlangen (DE); Günter Schwesig, Erlangen (DE); Heiko Zatocil, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 30 days.

(21) Appl. No.: 13/948,931

(22) Filed: Jul. 23, 2013

(65) Prior Publication Data

US 2014/0026681 A1    Jan. 30, 2014

(30) Foreign Application Priority Data

Jul. 24, 2012  (DE) .......................... 10 2012 212 972

(51) Int. Cl.
| | | |
|---|---|---|
| *G01L 3/02* | (2006.01) | |
| *G01L 3/10* | (2006.01) | |
| *G01L 3/00* | (2006.01) | |
| *H02P 21/14* | (2006.01) | |
| *H02P 23/03* | (2006.01) | |

(52) U.S. Cl.
CPC ... *G01L 3/10* (2013.01); *G01L 3/00* (2013.01); *H02P 21/148* (2013.01); *H02P 23/03* (2013.01)

(58) Field of Classification Search
CPC ............. G01L 3/10; G01L 3/24; H02P 23/00; H02P 23/04; G01D 5/24428
USPC ....................... 73/862.325–862.326, 862.193
See application file for complete search history.

(56) References Cited

U.S. PATENT DOCUMENTS

| | | | | |
|---|---|---|---|---|
| 4,685,528 | A  * | 8/1987 | Suzuki et al. ................. | 180/446 |
| 4,754,829 | A  * | 7/1988 | Shimizu ........................ | 180/446 |
| 5,525,877 | A  * | 6/1996 | Umida .......................... | 318/432 |
| 7,192,374 | B2 * | 3/2007 | Kuras et al. ................... | 475/153 |
| 7,275,518 | B1 * | 10/2007 | Gartner et al. ........... | 123/406.23 |
| 7,276,806 | B1 * | 10/2007 | Sheidler et al. ............. | 290/40 A |
| 7,555,374 | B2 * | 6/2009 | Wu et al. ...................... | 701/33.7 |
| 7,734,401 | B2 * | 6/2010 | Joe et al. ......................... | 701/54 |
| 7,737,652 | B2 | 6/2010 | Schwesig | |
| 8,285,431 | B2 * | 10/2012 | Heap et al. ...................... | 701/22 |

FOREIGN PATENT DOCUMENTS

| | | |
|---|---|---|
| DE | 101 00 565 A1 | 7/2002 |
| DE | 102 51 095 A1 | 5/2004 |

(Continued)

*Primary Examiner* — Max Noori
(74) *Attorney, Agent, or Firm* — Henry M. Feiereisen LLC (57) ABSTRACT

A method for determining an electrical torque of an electrical machine includes determining an electrical torque in a first speed range with a first algorithm, and determining the electrical torque in a second speed range with a second algorithm which differs from the first algorithm. An upper limit of the second speed range is slightly higher than a lower limit of the first speed range. An apparatus is provided to determine the electrical torque of the electrical machine with the aforedescribed method.

9 Claims, 5 Drawing Sheets

(56) References Cited

FOREIGN PATENT DOCUMENTS

| | | |
|---|---|---|
| DE | 10 2006 042 038 B3 | 2/2008 |
| DE | 10 2010 006 593 A1 | 8/2011 |
| JP | 2000-287472 A | 10/2000 |

* cited by examiner

METHOD AND APPARATUS FOR DETERMINING AN ELECTRICAL TORQUE OF AN ELECTRICAL MACHINE

CROSS-REFERENCES TO RELATED APPLICATIONS

This application claims the priority of German Patent Application, Serial No. 10 2012 212 972.3, filed Jul. 24, 2012, pursuant to 35 U.S.C. 119(a)-(d), the content of which is incorporated herein by reference in its entirety as if fully set forth herein.

BACKGROUND OF THE INVENTION

The present invention relates to a method for determining an electrical torque of an electrical machine, wherein the method includes a first step of determining an electrical torque in a first speed range with a first algorithm.

The invention further relates to an apparatus for determining an electrical torque of an electrical machine.

The following discussion of related art is provided to assist the reader in understanding the advantages of the invention, and is not to be construed as an admission that this related art is prior art to this invention.

In the case of variable-speed electrical three-phase drives for industry (for example in production machines, machine tools and electric vehicles), safety technology is used to protect people and machines by implementing, for example, functions such as "safely limited speed", "safe stop" and "safe operation stop." These functions in accordance with the prior art are not sufficient to cope with all hazard situations.

This is explained using the following example: a machine component consists of driven rollers (similar to a mangle). The material is transported or processed via the rollers. For maintenance purposes, repair purposes and cleaning or for removing trapped material the operator has to reach into the machine component. It is also necessary for the rollers to move for the maintenance, repair or cleaning operation. To this end the rollers are operated at 'safely reduced speed'. However, despite the reduced speed a potential hazard still exists. If for example a finger is caught between the rollers, it is injured. Or the person is no longer able to move away from the machine component in the event of danger. Other examples are window raising systems in cars or elevator doors.

Hence in addition to safely limiting the speed, a way of safely limiting the torque is required. The torque should be limited sufficiently so that when a finger gets between the rollers, the maximum torque generated by the rollers is such that there is still no risk of injury or that the counter-torque of the finger brings the rollers to a standstill. This "safe torque limiting" function, known as 'Safely Limited Torque' (SLT), now forms part of IEC61800-5-2 (CD).

In the case of electric vehicles, no dangerous situation should likewise occur in the event of an error. In electric vehicles the drive is given a desired torque value (with a gas pedal). The actual torque of the drive may differ only slightly from the desired value, or at least may exceed the desired value only very slightly, as in the event of larger deviations the vehicle can, under certain circumstances, no longer be controlled. Hence reliable detection of the torque with appropriate monitoring is necessary. In the prior art clutches, slip clutches, rupture joints or torque sensors are used for this.

It would therefore be desirable and advantageous to obviate prior art shortcomings and to provide an improved method and an apparatus with which an electrical torque of an electrical machine can be determined more accurately over a wide range of speeds.

SUMMARY OF THE INVENTION

According to one aspect of the present invention, a method for determining an electrical torque of an electrical machine includes a first step of determining an electrical torque in a first speed range with a first algorithm and the method includes a second step of determining the electrical torque in a second speed range with a second algorithm which differs from the first algorithm. An upper limit of the second speed range is hereby slightly higher than a lower limit of the first speed range.

According to another aspect of the present invention, an apparatus for determining an electrical torque of an electrical machine is configured to determine the electrical torque of the electrical machine by using the aforedescribed method.

By using another algorithm to determine the torque in the second speed range, an algorithm can be used for the second speed range which delivers more accurate results in the second speed range than the first algorithm would deliver in the second speed range. At the same time, the inventive measure enables an algorithm to be used in the first speed range which delivers more accurate results in the first speed range than the second algorithm would deliver in the first speed range.

According to an advantageous feature of the present invention, determining the electrical torque in the first speed range includes determination of a machine parameter and/or an operating parameter of the electrical machine, wherein the machine parameter and/or operating parameter determined in the first speed range is used to determine the electrical torque in the step of determining the electrical torque in the second speed range. Any shortcoming of the second algorithm can thus be adjusted or corrected with a machine parameter and/or an operating parameter which is determined in the first speed range.

According to another advantageous feature of the present invention, the machine parameter and/or the operating parameter may be a rotor resistance and/or a magnetic flux value. A machine parameter and/or an operating parameter which is particularly important for determining the torque in the second speed range can thus be adjusted or corrected.

Because an upper limit of the second speed range is only slightly higher than a lower limit of the first speed range, the contemplated algorithms can be unambiguously allocated across a total speed range in which the electrical machine is operated. On the other hand, with the slight overlap, a hysteresis range can be produced, in which an unnecessary switch between the algorithms of the first and of the second speed range is avoided.

According to another advantageous feature of the present invention, a changeover between the first algorithm and the second algorithm may depend on reliably determined speed data. The optimum algorithm is then used for each speed to determine the torque.

According to another advantageous feature of the present invention, the algorithm used in the second speed range may be selected from at least two different algorithms as a function of the type of the machine. An optimum algorithm can thus be used to determine the torque in the second speed range for each type of machine, without having to provide different controllers or different control software for different types of the machine.

Alternatively or additionally, the algorithm used in the first speed range may be selected as a function of the type of machine from at least two different algorithms. An optimum algorithm can then be used to determine the torque in the first speed range for each type of machine, without having to provide different controllers or different control software for different types of machine.

According to another advantageous feature of the present invention, the torque may be determined in the first speed range from speed data reliably determined with a speed sensor. The speed can thus be determined with a still higher accuracy and/or reliability than if the speed data is determined exclusively from an EMF. For example, in an exemplary synchronous machine, the speed multiplied by the number of pole pairs can be used instead of calculating the stator frequency via the EMF. As a result, the need to process a variable affected by harmonics can be avoided. Alternatively or additionally, a reliably detected rotor position angle may used in the second speed range to determine the torque for similar reasons.

According to another advantageous feature of the present invention, the method can also include a step for determining a mechanical torque of the electrical machine, in which for the first speed range a drag torque is determined, taking account of mechanical losses and/or taking account of iron losses. Alternatively or additionally, the method may also include a step for determining a mechanical torque of the electrical machine, in which for the second speed range a drag torque is determined, taking account of mechanical losses and/or taking account of iron losses. A mechanical torque can thus be determined with greater accuracy than if only the value of an electrical torque is taken as a value for the mechanical torque. The iron losses can be determined by taking into account the magnetic field frequency and the magnetic flux (for example using the Steinmetz formula).

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
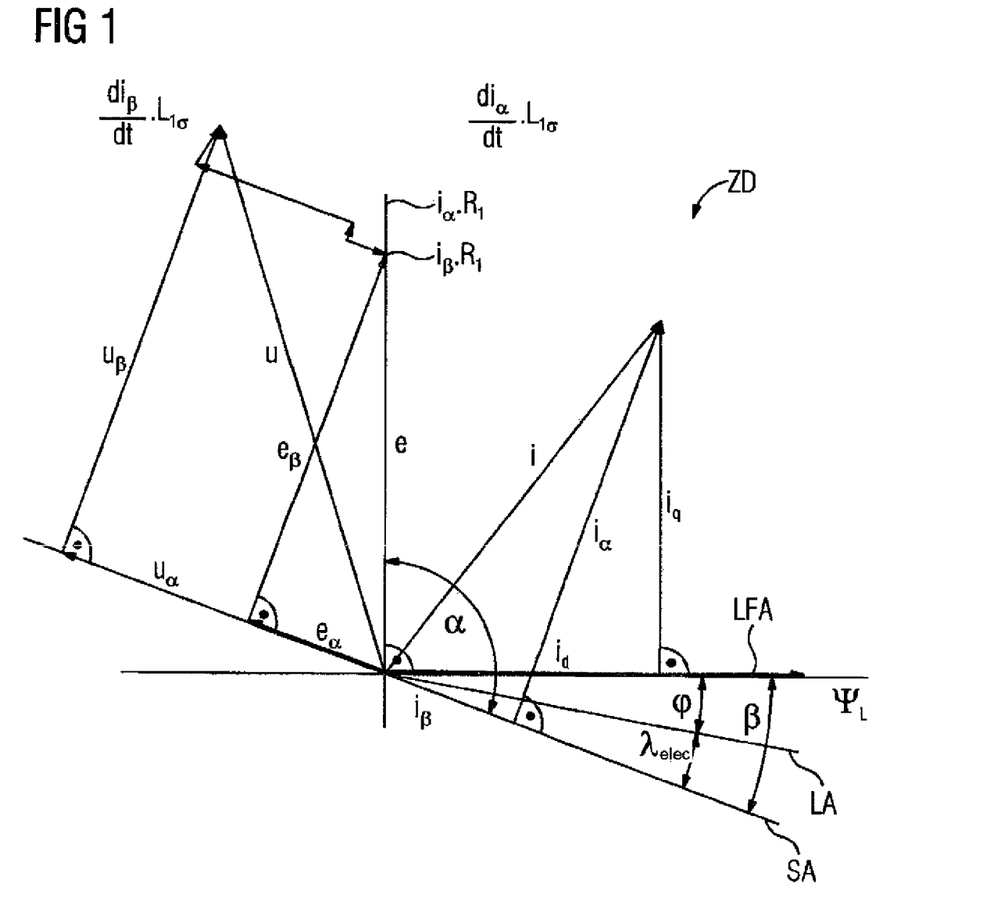
FIG. 1 shows schematically a phasor diagram for an asynchronous machine, which can also be used to consider the behavior of a synchronous machine, by setting the angle f between rotor flux axis and rotor axis as equal to zero.

Turning now to the drawing, and in particular to FIG. 1, there is shown a phasor diagram ZD for an asynchronous machine ASM. The phasor diagram can also be used to consider the behavior of a synchronous machine SM, by setting the angle f between rotor flux axis LFA and rotor reference axis LA as equal to zero. The reference characters have the following meaning: e is EMF (electromotive force), $L_{1d}$ is stator leakage inductance, $R_1$ is stator resistance, u is the external voltage, a, β are Cartesian stator axes rotating with stator frequency, d, q are Cartesian rotor axes, f is an angle rotating with drag frequency and $\Psi_L$ is the rotor flux. The pointer of $\Psi_L$ points in the direction of the rotor flux axis LFA, the line LA points in the direction of the rotor reference axis, and the line LS points in the direction of a stator reference axis SA.

Figure 2:
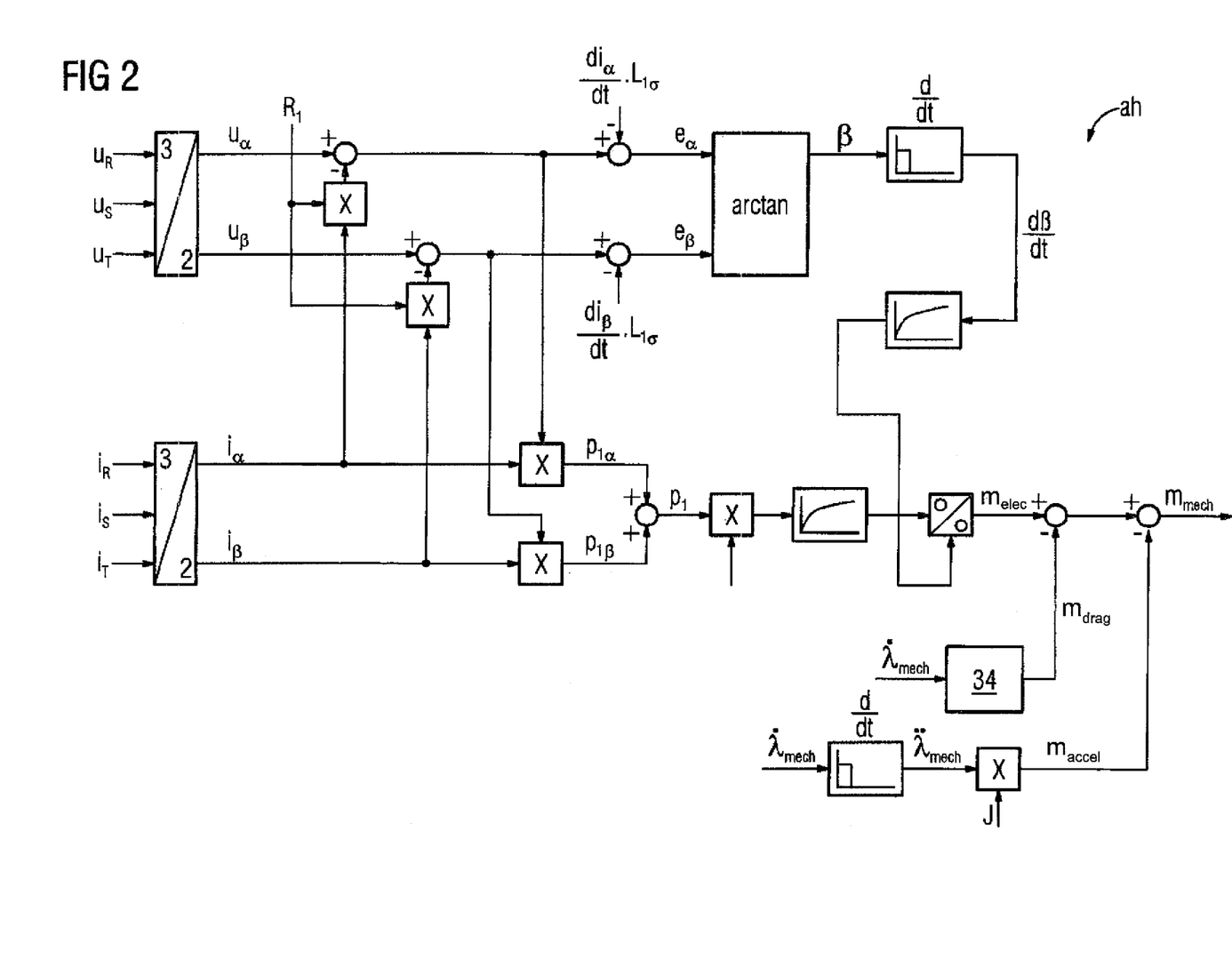
FIG. 2 shows schematically a first algorithm according to the present invention for determining an electrical and a mechanical torque of an electrical machine in an upper (first) speed range.

FIG. 2 shows a first algorithm ah for determining an electrical torque $m_{elec}$ and for determining a mechanical $m_{mech}$ torque of an electrical machine by calculating a quotient $m_{elec}=(3z_p/2)p_1/(2p \cdot d\beta/dt)$ from the following intermediate variables: stator output $p_1$, stator frequency $d\beta/dt$ and number of pole pairs $z_p$.

The algorithm ah, which is known to the person skilled in the art, delivers, in an upper (first) speed range rωh both for a synchronous machine SM and also for an asynchronous machine ASM, results which are sufficiently accurate for many applications. One reason for this is that at higher speeds the temperature-dependent rotor resistance $R_2$ of an asynchronous machine ASM has only a minimal and generally negligible influence on the torque $m_{elec}$ of the electrical machine. Accordingly, in a permanently-excited synchronous machine PSM the temperature-dependent, permanent magnetic rotor flux $\Psi_L$ still only has a minimal and generally negligible influence on the torque $m_{elec}$ of the electrical machine SM at high speeds.

However, at low speeds the voltage u (see FIG. 1) is very small, because the EMF e and the leakage reactance drops $(di_\alpha/dt)L_{1d}$, $(di_\beta/dt)L_{1d}$ are proportional to the stator frequency $d\beta/dt$. Additionally the ohmic voltage drop $i_\alpha R_1$, $i_\beta R_1$ dominates more and more the lower the speed. As a result, the most minor inaccuracies in determining the stator resistance, flux and frequency lead to disproportionate errors when determining the torque. The torque $m_{elec}$ can simply not be calculated in this way when the electrical machine SM, ASM is at a standstill, because this would result in a division by zero. Because of this, at low speeds it is not possible to determine the torque with the first algorithm ah using output values $p_1$, or at best only by accepting disadvantages.

To also be able to determine the torque in the lower speed range rωk with sufficient accuracy, it is proposed to determine the torque $m_{elec}$ in the lower speed range rωk using currents $i_\alpha$, $i_\beta$, machine parameters $\Psi_d$, $\Psi_q$ and transformations VD, 26 with angles $\Lambda_{elec}$, β, f. This assumes reliably generated or reliably detected variables (such as rotor position angle $\Lambda_{mech}$, speed $d\Lambda_{mech}/dt$, phase currents $i_R$, $i_S$, $i_T$, phase voltages $u_R$, $u_S$, $u_T$ and temperatures). For the reliable generation of the above-mentioned variables a multiplicity of variants is known which can be selected as a function of the hardware and software topology used.

Figure 3:
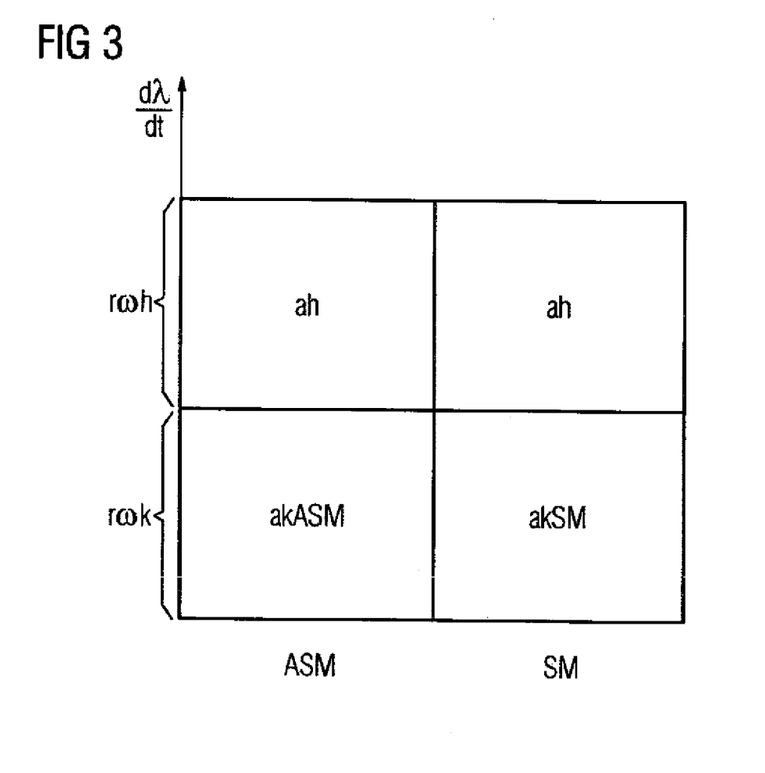
FIG. 3 shows schematically an assignment of different algorithms for different speed ranges and for different types of machine.

FIG. 3 shows an example of an assignment of different algorithms ah, akASM, akSM to different speed ranges rωh, rωk and for different types of machine ASM, SM. Here, in a first upper speed range rωh the same shared algorithm ah is used for both types of machine ASM, SM. In the second lower speed range rωk different algorithms akASM and akSM are used for different types of machine ASM, SM. An embodiment is described below for each of the algorithms akASM and akSM.

Figure 4:
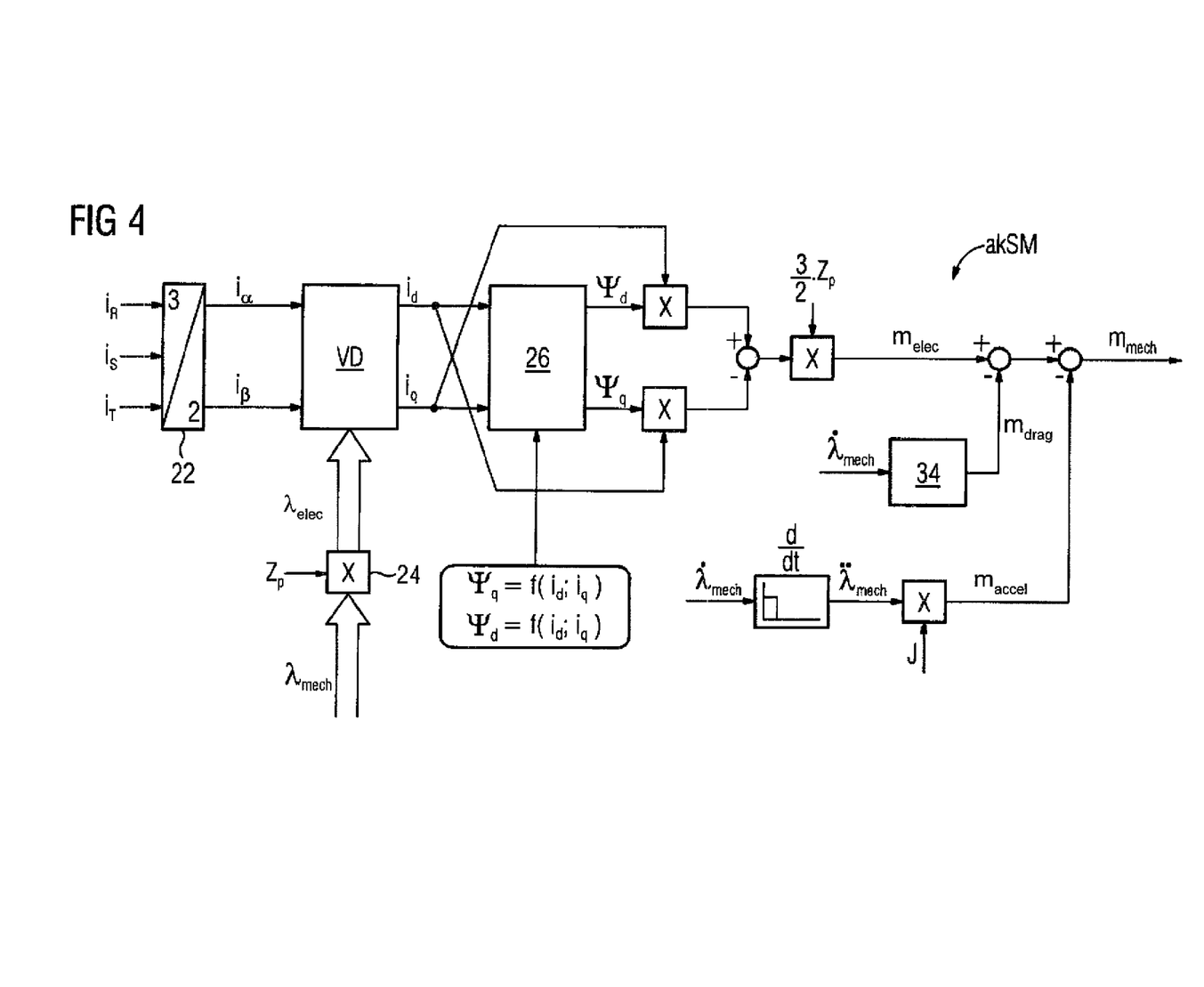
FIG. 4 shows schematically a second algorithm according to the present invention for determining an electrical and a mechanical torque of a synchronous machine in a lower (second) speed range.

FIG. 4 shows an example of an algorithm akSM for determining an electrical torque $m_{elec}$ and a mechanical torque $m_{mech}$ of a synchronous machine SM in a lower (second) speed range rωk. Initially the motor phase currents $i_R$, $i_S$, $i_T$ are mapped with a coordinate converter 22 into Cartesian stator currents $i_\alpha$, $i_\beta$. Then an electrical rotor angle $\Lambda_{elec}$ is determined by multiplication 24 of a mechanical rotor angle $\Lambda_{mech}$ by the number of pole pairs $z_p$ of the electrical machine. Next the stator current is transformed with a vector rotator VD and the electrical rotor angle $\Lambda_{elec}$ into Cartesian rotor current components $i_d$, $i_q$. Cartesian rotor flux components $\Psi_d$, $\Psi_q$ are determined from the Cartesian rotor current components $i_d$, $i_q$ with a further transformation 26 (for example with tables). Then the determined value of the Cartesian rotor flux component $\Psi_d$ of the main direction d is multiplied by the determined rotor current component $i_q$ of the transverse direction q. Additionally the determined value of the Cartesian rotor flux component $\Psi_q$ of the transverse direction q is multiplied by the determined rotor current component $i_d$ of the main direction d. Next, both the products $\Psi_d \cdot i_q$ and $\Psi_q \cdot i_d$ are summed and the result is multiplied by one and a half times the number of pole pairs $z_p$, in order thus to obtain the electrical torque $m_{elec}$.

Figure 5:
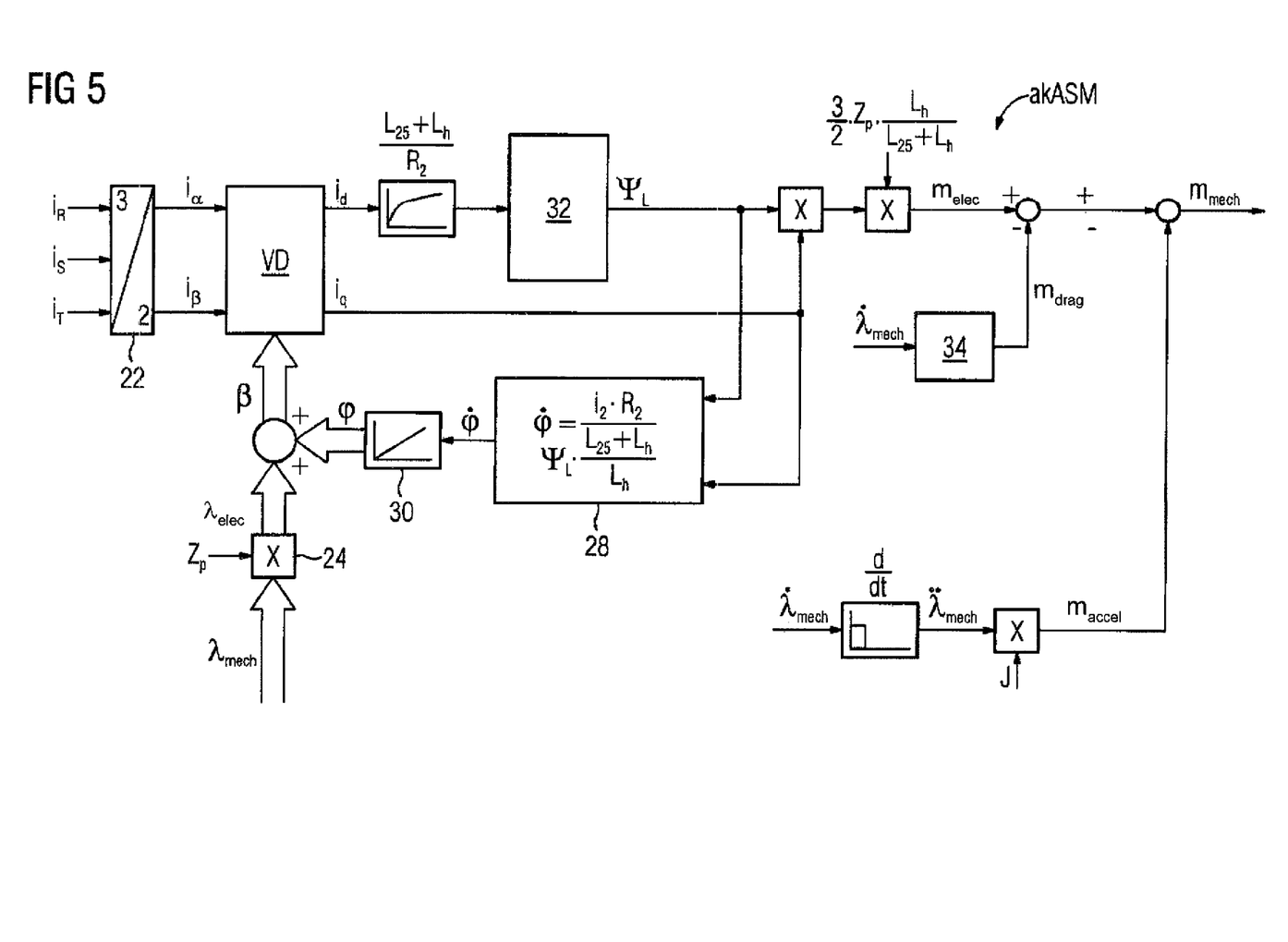
FIG. 5 shows schematically a third algorithm according to the present invention for determining an electrical and a mechanical torque of an asynchronous machine in a lower (second) speed range.

FIG. 5 shows an example of an algorithm akASM for determining an electrical torque $m_{elec}$ and a mechanical torque $m_{mech}$ of an asynchronous machine ASM in a lower (second) speed range rωk. Initially the motor phase currents $i_R$, $i_S$, $i_T$ are mapped with a coordinate converter 22 into Cartesian stator currents $i_\alpha$, $i_\beta$. Then an electrical rotor angle $\Lambda_{elec}$ is determined by multiplication 24 of a mechanical rotor angle $\Lambda_{mech}$ by the number of pole pairs $z_p$ of the electrical machine. For this, a rate of change df/dt of an angle f rotating with drag frequency is determined from Cartesian rotor current components $i_d$, $i_q$ and a current model 28. Using integration 30 the angle f rotating with drag frequency is determined therefrom. The angle f rotating with drag frequency is added to the determined electrical rotor angle $\Lambda_{elec}$, to produce an angle β rotating with stator frequency $d\Lambda_{elec}/dt$. Then the stator current $i_\alpha$, $i_\beta$ is transformed into Cartesian rotor current components $i_d$, $i_q$ by a vector rotator VD and the angle β (rotating with stator frequency $d\Lambda_{elec}/dt$). A rotor flux $\Psi_L$ is calculated from the Cartesian rotor current component $i_d$ of the main direction d with a characteristic magnetization curve 32 (for example with a table). Account is taken here of a ratio $(L_{2d}+L_h)/R_2$ from a rotor inductance $(L_{2d}+L_h)$ and a rotor resistance $R_2$. Then the determined value of the rotor flux $\Psi_L$ is multiplied by the determined rotor current component $i_q$ of the transverse direction q. Next the product $\Psi_L \cdot i_q$ is multiplied by one and a half times the number of pole pairs zp and a main field inductance proportion $L_h/(L_{2d}+L_h)$ of the rotor, in order thus to obtain the electrical torque $m_{elec}$.

Figure 6:
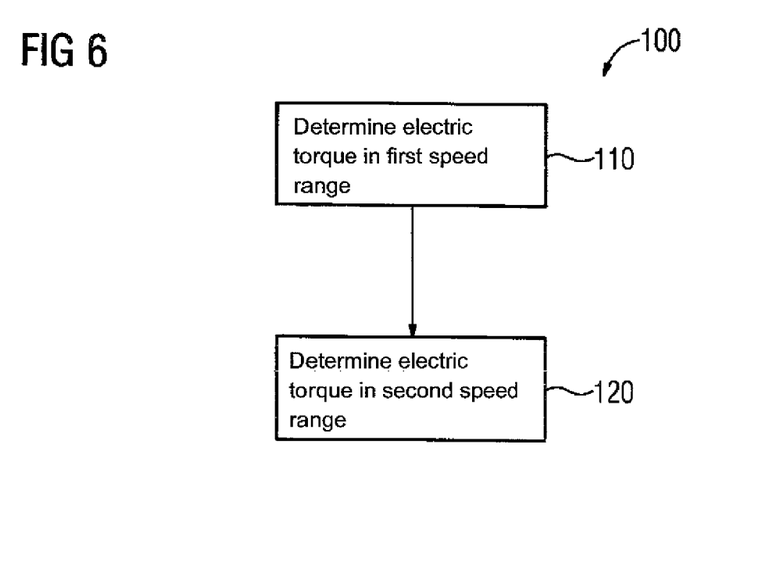
FIG. 6 shows schematically a sequence of a method for determining an electrical and a mechanical torque.

FIG. 6 shows a sequence of a method 100 for determining an electrical torque $m_{elec}$ of an electrical machine ASM, SM, which includes the following steps: at step 110, determining an electrical torque $m_{elec}$ in a first speed range rωh with a first algorithm ah; and at step 120, determining the electrical torque $m_{elec}$ in a second speed range rωk with a second algorithm akASM, akSM which differs from the first algorithm ah. Thus different algorithms ah, akASM, AkSM are used to detect the torque in the various speed ranges rωh, rωh.

Greater reliability can be achieved with two-channel structures (for example in order to achieve an SIL or ASIL level).

For the algorithms ah, akASM, AkSM shown the electrical torque $m_{elec}$ is first determined. This is sufficient for many applications, because the mechanical torque $m_{mech}$ generally deviates relatively little from the electrical torque $m_{elec}$.

Determining the electrical torque $m_{elec}$ or the mechanical torque $m_{mech}$ according to the algorithms ah, akSM, akASM of FIG. 2 to FIG. 5 is also sufficiently accurate for many applications if a temperature dependency (for example of the stator resistance $R_1$, of the rotor resistance $R_2$, of a magnetic field strength of permanent magnets and/or of other parameters) is not taken into account.

To further increase the accuracy of measurement or to determine the mechanical torque $m_{mech}$, iron losses, eddy-current losses, friction losses and instance-specific characteristic values can also be taken into account. This is preferably done using a table 34 which is partially multidimensional. The input variables can here be current i, voltage u, speed $d\Lambda_{mech}/dt$ and other variables. Temperature-dependent parameters (such as $R_1$, $R_2$, $\Psi_L$) can be adjusted by measuring a temperature (for example with a sensor in the stator winding). The detection of the temperature (for example of a rotor temperature) can either be implemented on a two-channel basis, or else a plausibility test is carried out using models or other measuring points (for example with a coolant temperature). Alternatively, contactless measuring methods are conceivable, for example using a thermopile sensor.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for determining an electrical torque of an electrical machine having a rotor and a stator in a first high-rotation-speed range and in a second low-rotation-speed range, comprising:

in the first high-rotation-speed range, measuring stator phase currents and stator phase voltages to determine therefrom a stator power and a stator frequency and computing with a defined number of pole pairs of the electrical machine a first electrical torque in the first high-rotation-speed range with a first algorithm;

in the second low-rotation-speed range, determining an electrical rotor position angle from the defined number of pole pairs of the electrical machine and a mechanical rotor angle and computing stator flux components from the stator phase currents and the electrical rotor position angle, computing from the stator flux components a second electrical torque in the second low-rotation-speed range with a second algorithm which differs from the first algorithm, wherein an upper limit of the second low-rotation-speed range is slightly higher than a lower limit of the first high-rotation-speed range, defining a safe torque limiting function which limits a maximum permitted torque generated by the electrical machine in the second low-rotation-speed range, and reducing the torque in the second low-rotation-speed range so that the second electrical torque is smaller than the maximum permitted torque.

2. The method of claim 1, wherein the step of determining the first electrical torque includes determining a machine parameter or an operating parameter of the electrical machine, or both, wherein the machine parameter or the operating parameter determined in the first high-rotation-speed range is used to determine the electrical torque in the second speed range.

3. The method of claim 1, wherein a changeover between the first algorithm and the second algorithm is dependent on measured speed data of the electrical machine.

4. The method of claim 1, wherein the algorithm used in the second low-rotation-speed range is selected from at least two different algorithms as a function of a type of the machine.

5. The method of claim 1, wherein the algorithm used in the first high-rotation-speed range is selected from at least two different algorithms as a function of a type of the machine.

6. The method of claim 1, wherein the electrical torque in the first high-rotation-speed range is determined from speed data measured with a speed sensor.

7. The method of claim 1, further comprising determining a mechanical torque of the electrical machine by measuring a drag torque in the first high-rotation-speed range and by taking into account at least one of mechanical losses and iron losses.

8. The method of claim 1, further comprising determining a mechanical torque of the electrical machine by measuring a drag torque in the second low-rotation-speed range and by taking into account at least one of mechanical losses and iron losses.

9. An apparatus for determining an electrical torque of an electrical machine having a rotor and a stator in a first high-rotation-speed range and in a second low-rotation-speed range, said apparatus configured to in the first high-rotation-speed range, measure stator phase currents and stator phase voltages to determine therefrom a stator power and a stator frequency and computing with a defined number of pole pairs of the electrical machine a first electrical torque in the first high-rotation-speed range with a first algorithm;

in the second low-rotation-speed range, determine an electrical rotor position angle from the defined number of pole pairs of the electrical machine and a mechanical rotor angle and compute stator flux components from the stator phase currents and the electrical rotor position angle, compute from the stator flux components a second electrical torque in the second low-rotation-speed range with a second algorithm which differs from the first algorithm, wherein an upper limit of the second low-rotation-speed range is slightly higher than a lower limit of the first high-rotation-speed range, define a safe torque limiting function which limits a maximum permitted torque generated by the electrical machine in the second low-rotation-speed range, and reduce the torque in the second low-rotation-speed range so that the second electrical torque is smaller than the maximum permitted torque.

* * * * *